United States Patent
Hsiao

(10) Patent No.: US 11,979,548 B2
(45) Date of Patent: May 7, 2024

(54) STRUCTURED LIGHT PROJECTOR AND THREE-DIMENSIONAL IMAGE SENSING APPARATUS

(71) Applicant: HIMAX TECHNOLOGIES LIMITED, Tainan (TW)

(72) Inventor: Ming-Shu Hsiao, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/658,444

(22) Filed: Apr. 8, 2022

(65) Prior Publication Data

US 2023/0328218 A1    Oct. 12, 2023

(51) Int. Cl.
H04N 13/254    (2018.01)
H04N 9/31    (2006.01)

(52) U.S. Cl.
CPC ......... *H04N 13/254* (2018.05); *H04N 9/3152* (2013.01); *H04N 9/3161* (2013.01)

(58) Field of Classification Search
CPC ............ G02B 27/0944; F21Y 2115/10; H04N 13/254; H04N 9/3152; H04N 9/3161
See application file for complete search history.

(56) References Cited

U.S. PATENT DOCUMENTS

| | | | |
|---|---|---|---|
| 10,168,147 B2 | 1/2019 | Raz et al. | |
| 10,578,781 B1* | 3/2020 | Zhu | G02B 5/0257 |
| 11,022,813 B2 | 6/2021 | Ma | |
| 11,063,407 B1* | 7/2021 | Ginzburg | H01S 5/0624 |
| 11,365,863 B2* | 6/2022 | Bremer | F21V 5/007 |
| 2010/0254020 A1* | 10/2010 | Govyadinov | G02B 19/0014 359/566 |
| 2016/0328854 A1* | 11/2016 | Kimura | G01B 11/026 |
| 2016/0377414 A1* | 12/2016 | Thuries | G02B 3/0056 359/558 |
| 2017/0115497 A1 | 4/2017 | Chen et al. | |
| 2017/0156192 A1 | 6/2017 | Chern et al. | |
| 2018/0048880 A1* | 2/2018 | Trail | H04N 13/366 |
| 2019/0049097 A1* | 2/2019 | Rossi | F21V 14/06 |
| 2019/0068853 A1* | 2/2019 | Price | G02B 27/425 |

(Continued)

FOREIGN PATENT DOCUMENTS

| | | |
|---|---|---|
| CN | 107429993 A | 12/2017 |
| CN | 111880318 A | 11/2020 |

(Continued)

*Primary Examiner* — Zheng Song
(74) *Attorney, Agent, or Firm* — CKC & Partners Co., LLC

(57) ABSTRACT

A structured light projector is disclosed, which includes a first light source, a second light source, an optical refractive element and an optical shaper. The first light source and the second light source are configured to respectively emit first incoherent light and second incoherent light. The optical refractive element is arranged over the first and second light sources for refracting the first incoherent light and the second incoherent light. The optical shaper element is arranged over the optical refractive element for shaping the first incoherent light to generate first structured light with plural first optical patterns and shaping the second incoherent light to generate second structured light with plural second optical patterns, in which the first structured light and the second structured light are overlapped onto a region of space.

20 Claims, 18 Drawing Sheets

(56) References Cited

U.S. PATENT DOCUMENTS

| | | | |
|---|---|---|---|
| 2019/0086681 A1 | 3/2019 | Chi et al. | |
| 2019/0379180 A1 | 12/2019 | Tsai et al. | |
| 2019/0379881 A1 | 12/2019 | Tewes | |
| 2020/0251886 A1* | 8/2020 | Kuo | G02B 27/20 |
| 2021/0356755 A1* | 11/2021 | Yonehara | G03B 21/2033 |
| 2023/0216273 A1* | 7/2023 | Quaade | H01S 5/042 |
| | | | 372/38.02 |

FOREIGN PATENT DOCUMENTS

| | | |
|---|---|---|
| CN | 213659105 U | 7/2021 |
| JP | 2020-153820 A | 9/2020 |
| KR | 10-2018-0088647 A | 8/2018 |
| WO | 2021250113 A1 | 12/2021 |

\* cited by examiner

STRUCTURED LIGHT PROJECTOR AND THREE-DIMENSIONAL IMAGE SENSING APPARATUS

BACKGROUND

Field of the Invention

The invention relates to structured light projection, and more particularly to a structured light projector and a three-dimensional image sensing apparatus.

Description of Related Art 3D stereoscopic image sensing technologies have been gradually adopted for various applications, such as facial recognition and obstacle detection. For recognition applications, different types of structured light projectors may be adopted for various usages. For example, a structured light projector may project light dot patterns for calculating surface profiles of a human's face, and project light line patterns for calculating a human's motion. On the other hand, the projection uniformity of the structured light projector is one of the key factors critical to sensing quality.

SUMMARY

The purpose of the invention is to provide a structured light projector and a three-dimensional image sensing apparatus that project light patterns with high uniformity for better three-dimensional sensing quality.

One aspect of the invention directs to a structured light projector which includes a first light source, a second light source, an optical refractive element and an optical shaper. The first light source and the second light source are configured to respectively emit first incoherent light and second incoherent light. The optical refractive element is arranged over the first and second light sources for refracting the first incoherent light and the second incoherent light. The optical shaper element is arranged over the optical refractive element for shaping the first incoherent light to generate first structured light with plural first optical patterns and shaping the second incoherent light to generate second structured light with plural second optical patterns, in which the first structured light and the second structured light are overlapped onto a region of space.

In accordance with one or more embodiments of the invention, a distance between the first light source and the optical refractive element is substantially the same as a distance between the second light source and the optical refractive element.

In accordance with one or more embodiments of the invention, the first and second light sources are vertical cavity surface emitting lasers (VCSELs).

In accordance with one or more embodiments of the invention, the first optical patterns and the second optical patterns are all M×N light dot patterns, and (M−1)×N light dot patterns of the first optical patterns and (M−1)×N light dot patterns of the second optical patterns are overlapped onto the region of space, where M and N are integers greater than 1.

In accordance with one or more embodiments of the invention, the optical shaper element is a two-dimensional fan out diffractive optical element (DOE).

In accordance with one or more embodiments of the invention, the optical shaper element is a microlens array.

In accordance with one or more embodiments of the invention, the structured light projector further includes an optical patterning element that is arranged between the optical refractive element and the optical shaper element.

In accordance with one or more embodiments of the invention, the optical patterning element is a diffractive line pattern generating element.

In accordance with one or more embodiments of the invention, the first optical patterns and the second optical patterns are all M×N light line patterns, and (M−1)×N light line patterns of the first optical patterns and (M−1)×N light line patterns of the second optical patterns are overlapped onto the region of space, where M and N are integers greater than 1.

In accordance with one or more embodiments of the invention, the optical shaper element and the optical patterning element are one-dimensional fan out DOEs.

In accordance with one or more embodiments of the invention, the optical refractive element and the optical patterning element are an integrated one-dimensional fan out DOE.

In accordance with one or more embodiments of the invention, the structured light projector further includes an optical patterning element that is arranged over a light projection side of the optical shaper element.

In accordance with one or more embodiments of the invention, the optical shaper element is a two-dimensional tiling DOE, and the optical patterning element is a diffractive line pattern generating element.

In accordance with one or more embodiments of the invention, the structured light projector further includes a third light source and a fourth light source. The third light source and the fourth light source are configured to respectively emit third incoherent light and fourth incoherent light. The optical refractive element is also arranged over the third and fourth light sources for refracting the third incoherent light and the fourth incoherent light. The optical shaper element is arranged for also shaping the third incoherent light to generate third structured light with plural third optical patterns and shaping the fourth incoherent light to generate fourth structured light with plural fourth optical patterns, and wherein the first structured light, the second structured light, the third structured light and the fourth structured light are overlapped onto the region of space.

In accordance with one or more embodiments of the invention, the first to fourth light sources are arranged respectively at four corners of an imaginary square.

In accordance with one or more embodiments of the invention, the first optical patterns, the second optical patterns, the third optical patterns and the fourth optical patterns are overlapped in two perpendicular dimensions that are perpendicular to each other.

In accordance with one or more embodiments of the invention, the first optical patterns, the second optical patterns, the third optical patterns the fourth optical patterns are all M×N light dot patterns, and (M−1)×(N−1) light dot patterns of the first optical patterns, (M−1)×(N−1) light dot patterns of the second optical patterns, (M−1)×(N−1) light dot patterns of the third optical patterns and (M−1)×(N−1) light dot patterns of the fourth optical patterns are overlapped onto the region of space, where M and N are integers greater than 1.

In accordance with one or more embodiments of the invention, the structured light projector further includes an optical patterning element that is arranged between the optical refractive element and the optical shaper element. The first optical patterns, the second optical patterns, the third optical patterns the fourth optical patterns are all M×N light line patterns, and (M−1)×(N−1) light line patterns of the first optical patterns, (M−1)×(N−1) light line patterns of the second optical patterns, (M−1)×(N−1) light line patterns of the third optical patterns and (M−1)×(N−1) light line patterns of the fourth optical patterns are overlapped onto the region of space, where M and N are integers greater than 1.

In accordance with one or more embodiments of the invention, the optical refractive element is a collimating lens.

Another aspect of the invention directs to a three-dimensional image sensing apparatus which includes plural light sources, an optical refractive element, an optical shaper element, an image sensor and a processor. The light sources are configured to respectively emit plural incoherent lights. The optical refractive element is arranged over the light sources for refracting the incoherent lights. The optical shaper element is arranged over the optical refractive element for shaping the incoherent lights to generate plural structured lights each with plural optical patterns, in which the structured lights are overlapped onto a region of space. The image sensor is configured to capture an image from the region of space. The processor is configured to perform computing on the image to obtain three-dimensional data associated with the region of space.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings.

DETAILED DESCRIPTION

Figure 1:
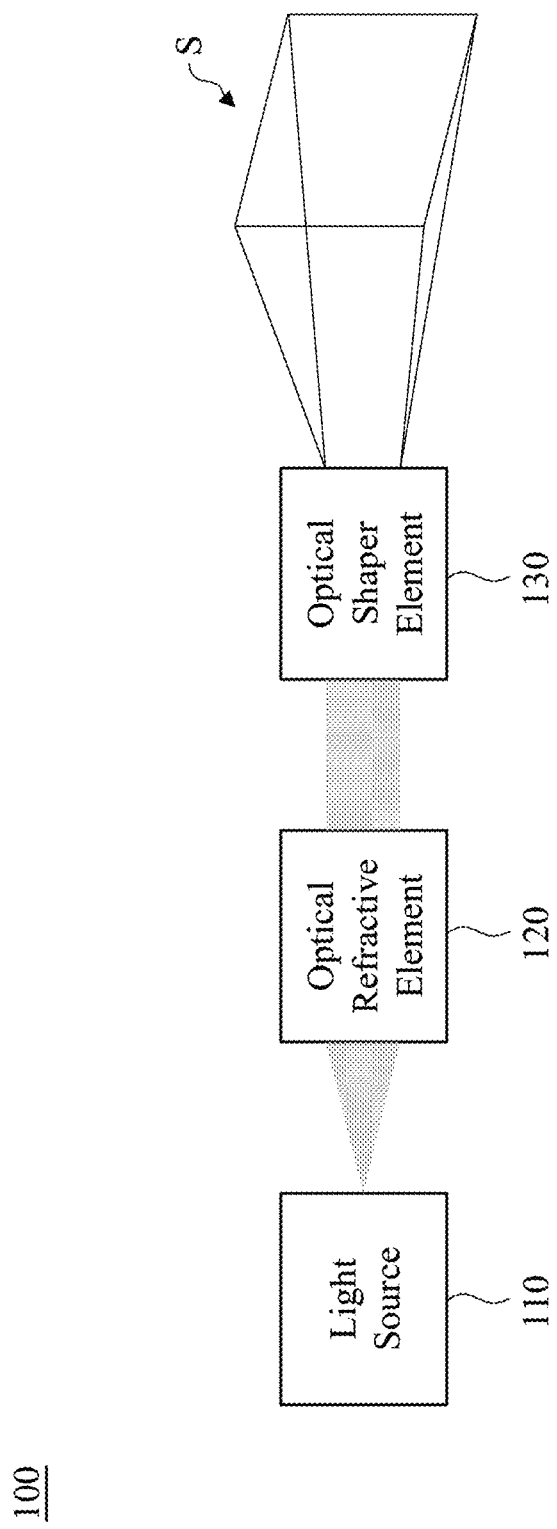
FIG. 1 is a schematic diagram of a structured light projector according to an example.

The detailed explanation of the invention is described as following. The described preferred embodiments are presented for purposes of illustrations and description, and they are not intended to limit the scope of the invention.

It will be understood that, although the terms "first," "second," "third" and "fourth" may be used herein to describe various elements and/or components, these elements and/or components should not be limited by these terms. These terms are only used to distinguish elements and/or components.

Terms used herein are only used to describe the specific embodiments, which are not used to limit the claims appended herewith. Unless limited otherwise, the term "a," "an," "one" or "the" of the single form may also represent the plural form. Further, the spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The document may repeat reference numerals and/or letters in the various examples. This repetition is for the purpose of simplicity and clarity and does not in itself dictate a relationship between the various embodiments and/or configurations discussed.

FIG. 1 is a schematic diagram of a structured light projector 100 according to an example. As shown in FIG. 1, the structured light projector 100 includes a light source 110, an optical refractive element 120 and an optical shaper element 130. The light source 110 is configured to emit light. The optical refractive element 120 is arranged over the light source 110 for refracting the light emitted by the light source 110 towards the optical shaper element 130. The optical shaper element 130 is arranged over the optical refractive element 120 for converting the refracted light into a projection light pattern and projecting the projection light pattern onto a region of space S.

Figure 2:
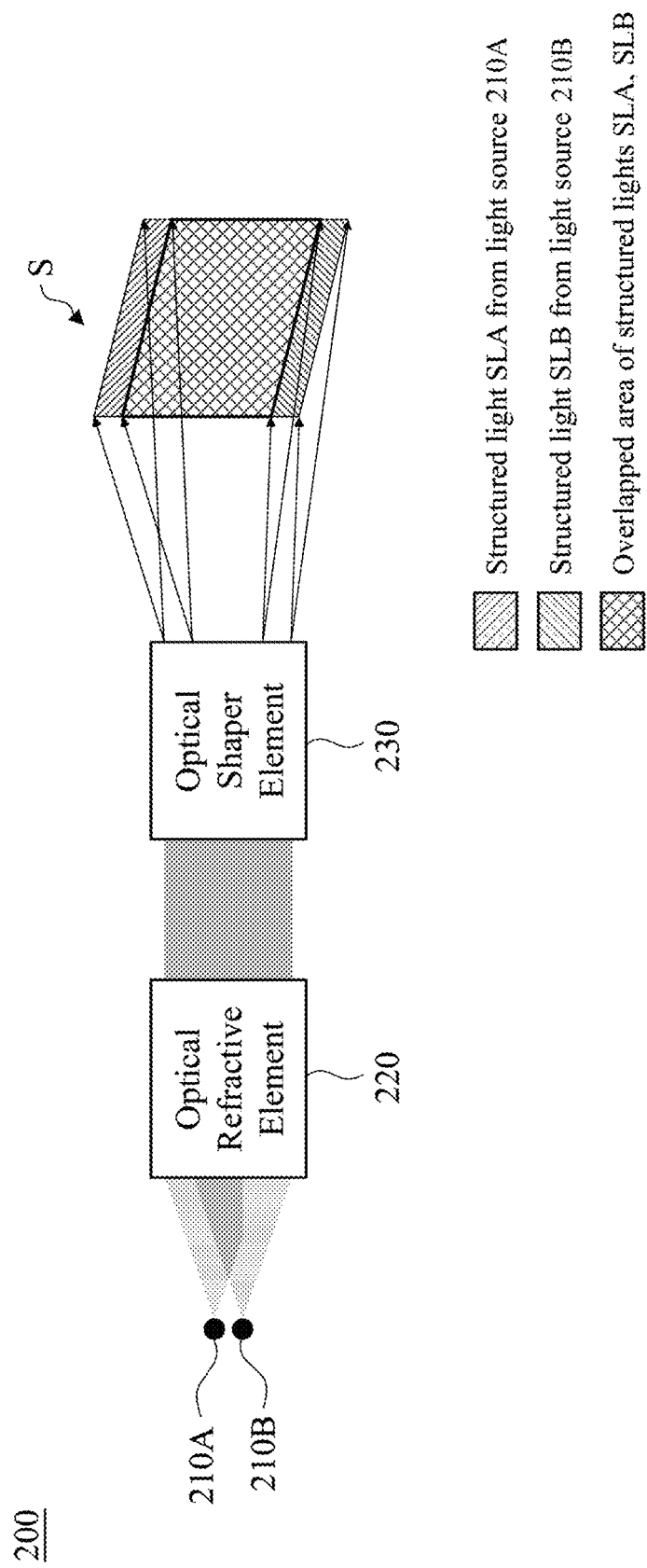
FIG. 2 is a schematic diagram of a structured light projector in accordance with one or more embodiments of the invention.

FIG. 2 is a schematic diagram of a structured light projector 200 in accordance with one or more embodiments of the invention. As shown in FIG. 2, the structured light projector 200 includes light sources 210A-210B, an optical refractive element 220 and an optical shaper element 230. Each of the light sources 210A-210B is configured to emit incoherent light, and may be a laser source, such as a vertical cavity surface emitting laser (VCSEL), a distributed feedback (DFB) semiconductor laser or another suitable light source. The optical refractive element 220 is arranged over the light sources 210A-210B for refracting the incoherent lights from the light sources 210A-210B towards the optical shaper element 230. The optical refractive element 220 may be, but is not limited to, a collimating lens, a convex lens, a concave lens, a liquid crystal lens or a Fresnel lens. For the incoherent lights respectively emitted by the light sources 210A-210B being the same, the distance between the light source 210A and the optical refractive element 220 may be substantially the same as the distance between the light source 210B and the optical refractive element 220. The optical shaper element 230 is arranged over the optical refractive element 220 for shaping the incoherent lights refracted by the optical refractive element 220 to generate structured lights SLA, SLB. For the configuration of the structured light projector 200, each of the structured lights SLA, SLB may be generated with plural optical patterns, such as light dot patterns or the like. The optical shaper element 230 may be a two-dimensional fan out diffractive optical element (DOE), a microlens array, a Fresnel lens array, a holographic optical element (HOE), or another optical element suitable for shaping incoherent light into a structured light with optical patterns. The structured lights SLA, SLB are projected and are overlapped onto a region of space S. The intensity distribution of the optical patterns of the structured lights SLA, SLB may be modulated by the profile of the optical shaper element 230.

Figure 3A:
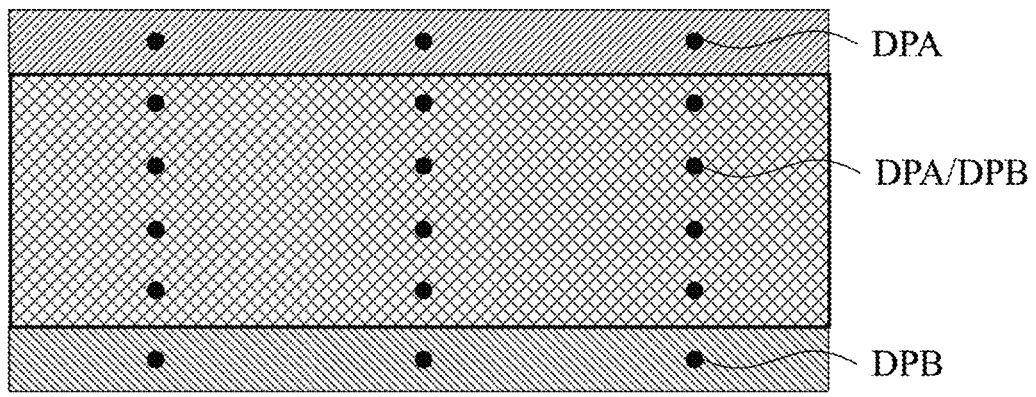
FIG. 3A illustratively shows projected structured lights with light dot patterns by the structured light projector in FIG. 2.
Figure 3B:
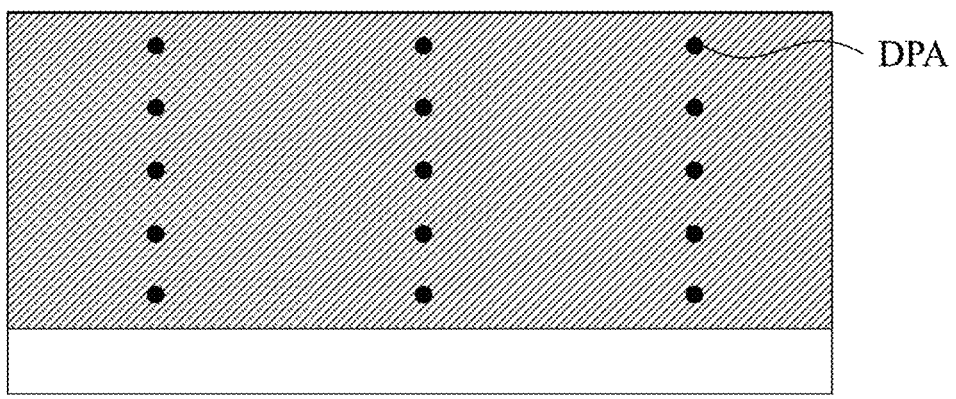
FIGS. 3B and 3C respectively show the projected structured lights with light dot patterns in FIG. 3A.
Figure 3C:
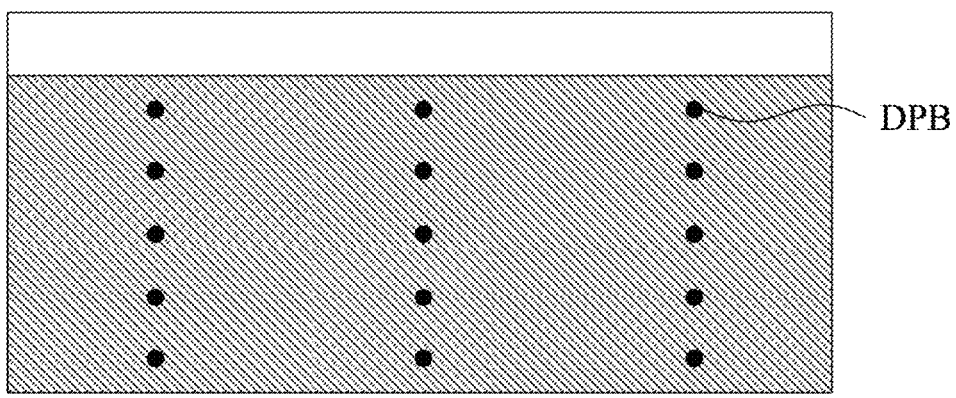

FIG. 3A illustratively shows the projected structured light SLA with light dot patterns DPA and the projected structured light SLB with light dot patterns DPB by the structured light projector 200 in FIG. 2. As shown in FIG. 3A, in the overlapped area of the structured lights SLA, SLB, the light dot patterns DPA are overlapped with the light dot patterns DPB, respectively. The overlapped area is also referred to as a high-uniformity projection area in which the light dot patterns DPA-DPB are overlapped in a one-to-one manner. Also, FIGS. 3B and 3C respectively show the projected structured lights SLA, SLB with the light dot patterns DPA, DPB in FIG. 3A. As shown in FIGS. 3A-3C, the uppermost row of light dot patterns DPA are all non-overlapped with any light dot pattern DPB, and the lowermost row of light dot patterns DPB are all non-overlapped with any light dot pattern DPA. In the exemplary example shown in FIGS. 3A-3C, the projected structured lights SLA, SLB are overlapped in a vertical direction. In other embodiments, by suitably adjusting the relative positions of the light sources 210A, 210B, the projected structured lights SLA, SLB may be overlapped in a horizontal direction or in a diagonal direction.

In certain embodiments, the light dot patterns of the structured light SLA and the light dot patterns of the structured light SLB are all M×N light dot patterns. Particularly, in a case in which the structured lights SLA and SLB are overlapped in a vertical direction, in some embodiments, (M−1)×N light dot patterns of the structured light SLA and (M−1)×N light dot patterns of the structured light SLB are overlapped onto the region of space S, where M and N are integers greater than 1; alternatively, in some other embodiments, (M−i)×N light dot patterns of the structured light SLA and (M−i)×N light dot patterns of the structured light SLB are overlapped onto the region of space S, where M and N are integers greater than 1, and i is an integer greater than 1 and less than M. In a case in which the structured lights SLA and SLB are overlapped in a horizontal direction, in some embodiments, M×(N−1) light dot patterns of the structured light SLA and M×(N−1) light dot patterns of the structured light SLB are overlapped onto the region of space S, where M and N are integers greater than 1; alternatively, in some other embodiments, M×(N−j) light dot patterns of the structured light SLA and M×(N−j) light dot patterns of the structured light SLB are overlapped onto the region of space S, where M and N are integers greater than 1, and j is an integer greater than 1 and less than N.

Figure 4:
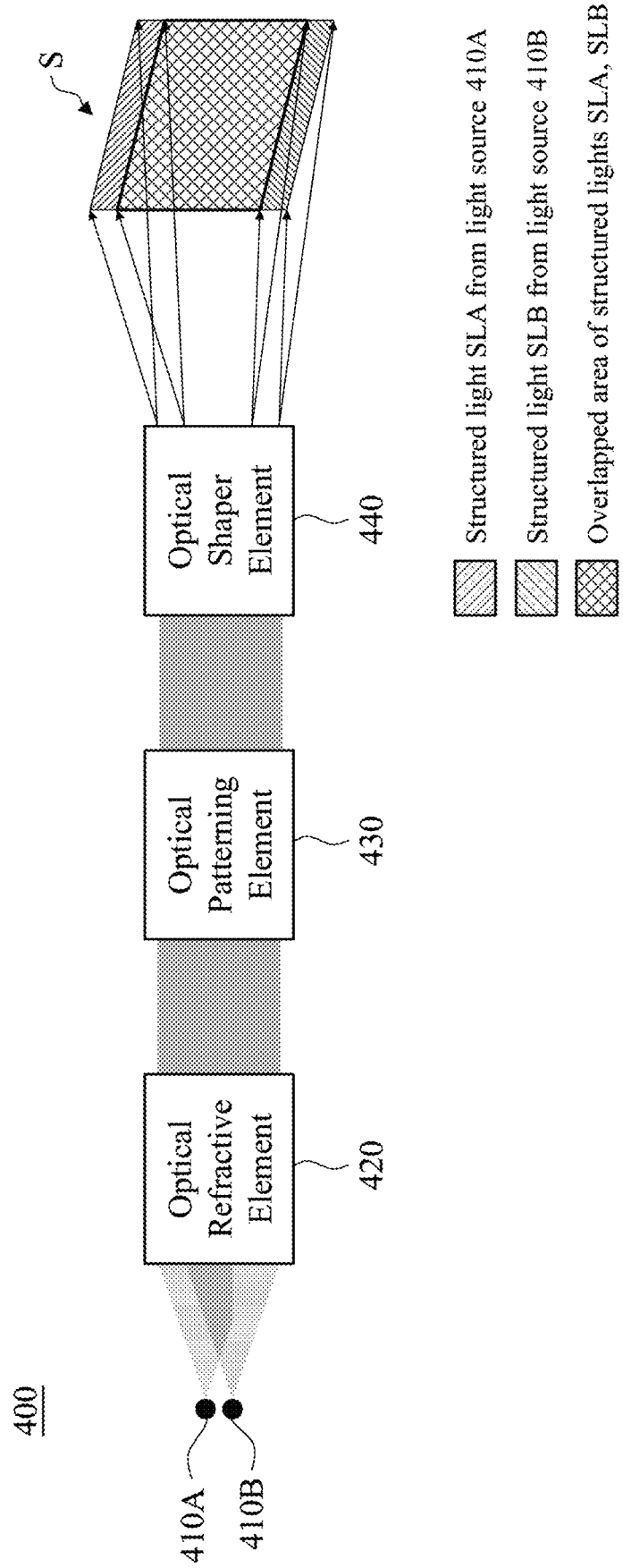
FIG. 4 is a schematic diagram of a structured light projector in accordance with one or more embodiments of the invention.

The illustration of FIGS. 3A-3C with an overlapped area of light dot patterns for high-uniformity projection may be achieved by another structured light projector derived from the structured light projector 200 in FIG. 2. FIG. 4 is a schematic diagram of a structured light projector 400 in accordance with one or more embodiments of the invention. As shown in FIG. 4, the structured light projector 400 includes light sources 410A-410B, an optical refractive element 420, and optical patterning element 430 and an optical shaper element 440. Each of the light sources 410A-410B is configured to emit incoherent light, and may be a laser source, such as a VCSEL, a DFB semiconductor laser or another suitable light source. The optical refractive element 420 is arranged over the light sources 410A-410B for refracting the incoherent lights from the light sources 410A-410B towards the optical patterning element 430. The optical refractive element 420 may be, but is not limited to, a collimating lens, a convex lens, a concave lens, a liquid crystal lens or a Fresnel lens. For the incoherent lights respectively emitted by the light sources 410A-410B being the same, the distance between the light source 410A and the optical refractive element 420 may be substantially the same as the distance between the light source 410B and the optical refractive element 420. The optical patterning element 430 is arranged between the optical refractive element 420 and the optical shaper element 440 for patterning the incoherent lights refracted by the optical refractive element 420 into diffractive light dots. The optical patterning element 430 may be a diffractive line pattern generating element, such as a one-dimensional fan out DOE, or another optical element suitable for generating diffractive light dots in one direction. The optical shaper element 440 is arranged over the optical patterning element 430 for shaping the diffractive light dots to generate structured lights SLA, SLB each with light dot patterns in an array and projected onto a region of space S. The optical shaper element 440 may be a diffractive line pattern generating element, such as a one-dimensional fan out DOE, or another optical element suitable for generating diffractive light dots in another direction that is perpendicular to the diffractive direction of the optical patterning element 430. The configuration of the structured light projector 400 also provides zero-order elimination.

Figure 5:
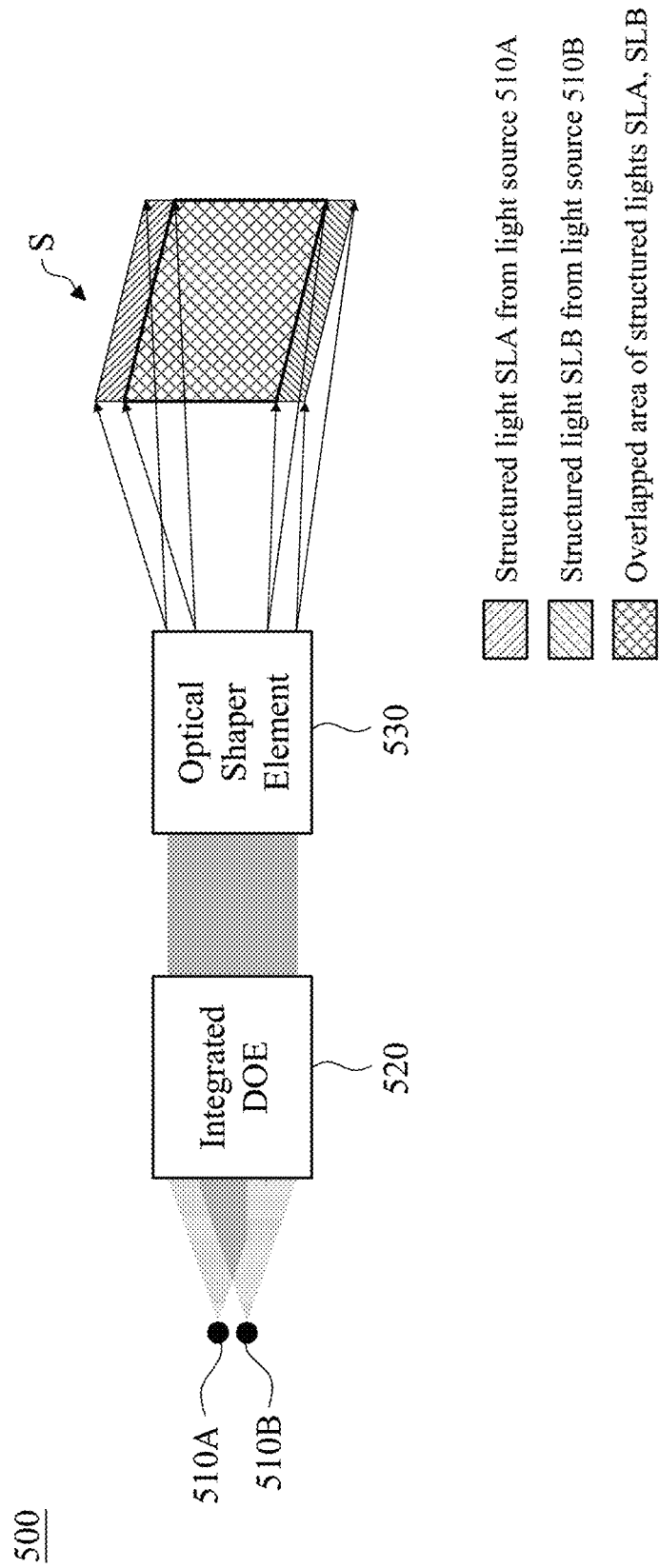
FIG. 5 is a schematic diagram of a structured light projector in accordance with one or more embodiments of the invention.

Another derivation from the structured light projector 200 for achieving the illustration of FIGS. 3A-3C is exemplified in FIG. 5. FIG. 5 is a schematic diagram of a structured light projector 500 in accordance with one or more embodiments of the invention. As shown in FIG. 5, the structured light projector 500 includes light sources 510A-510B, an integrated DOE 520 and an optical shaper element 530. Each of the light sources 510A-510B is configured to emit incoherent light, and may be a laser source, such as a VCSEL, a DFB semiconductor laser or another suitable light source. The integrated DOE 520 is arranged over the light sources 510A-510B for refracting the incoherent lights from the light sources 510A-510B as well as patterning the incoherent lights into diffractive light dots towards the optical shaper element 530. The integrated DOE 520 may be an integrated one-dimensional fan out DOE that integrates an optical lens and a one-dimensional fan out DOE for generating diffractive light dots in one direction. For the incoherent lights respectively emitted by the light sources 510A-510B being the same, the distance between the light source 510A and the integrated DOE 520 may be substantially the same as the distance between the light source 510B and the integrated DOE 520. The optical shaper element 530 is arranged over the integrated DOE 520 for shaping the diffractive light dots to generate structured lights SLA, SLB each with light dot patterns in an array and projected onto a region of space S. The optical shaper element 530 may be a diffractive line pattern generating element, such as a one-dimensional fan out DOE, or another optical element suitable for generating diffractive light dots in another direction that is perpendicular to the diffractive direction of the integrated DOE 520.

Figure 6:
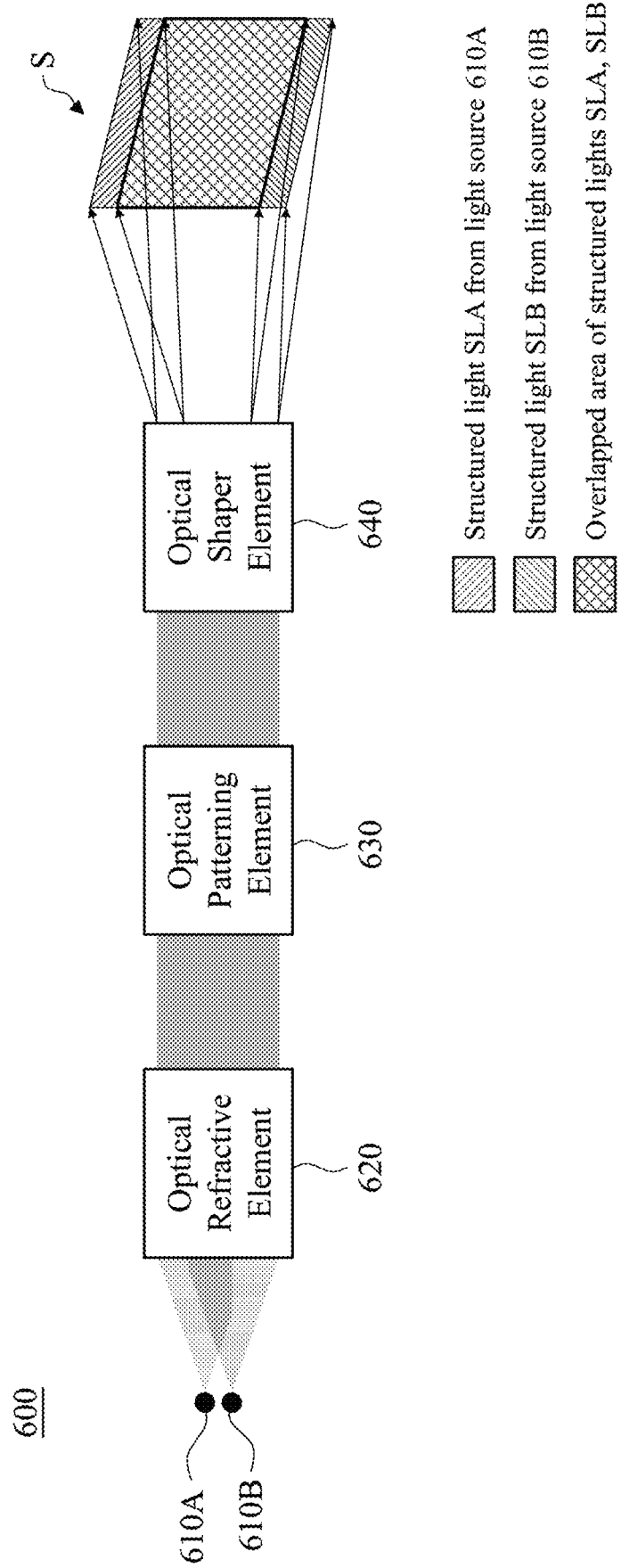
FIG. 6 is a schematic diagram of a structured light projector in accordance with one or more embodiments of the invention.

FIG. 6 is a schematic diagram of a structured light projector 600 in accordance with one or more embodiments of the invention. As shown in FIG. 6, the structured light projector 600 includes light sources 610A-610B, an optical refractive element 620, an optical patterning element 630 and an optical shaper element 640. Each of the light sources 610A-610B is configured to emit incoherent light, and may be a laser source, such as a VCSEL, a DFB semiconductor laser or another suitable light source. The optical refractive element 620 is arranged over the light sources 610A-610B for refracting the incoherent lights from the light sources 610A-610B towards the optical patterning element 630. The optical refractive element 620 may be, but is not limited to, a collimating lens, a convex lens, a concave lens, a liquid crystal lens or a Fresnel lens. For the incoherent lights respectively emitted by the light sources 610A-610B being the same, the distance between the light source 610A and the optical refractive element 620 may be substantially the same as the distance between the light source 610B and the optical refractive element 620. The optical patterning element 630 is arranged between the optical refractive element 620 and the optical shaper element 640 for patterning the incoherent lights refracted by the optical refractive element 620 into diffractive light lines. The optical patterning element 630 may be a diffractive line pattern generating element, such as a line generator DOE, or another optical element suitable for generating diffractive light lines. The optical shaper element 640 is arranged over the optical patterning element 630 for shaping the diffractive light lines to generate structured lights SLA, SLB. For the configuration of the structured light projector 600, each of the structured lights SLA, SLB may be generated with plural optical patterns, such as light line patterns or the like. The optical shaper element 640 may be a two-dimensional fan out DOE or another optical element suitable for shaping incoherent light into a structured light with optical patterns. The structured lights SLA, SLB are projected and are overlapped onto a region of space S.

Figure 7A:
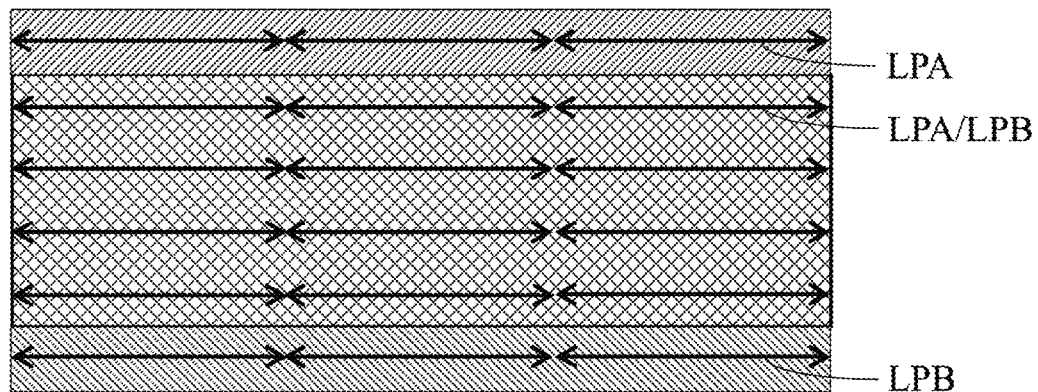
FIG. 7A illustratively shows projected structured lights with light line patterns by the structured light projector in FIG. 6.
Figure 7B:
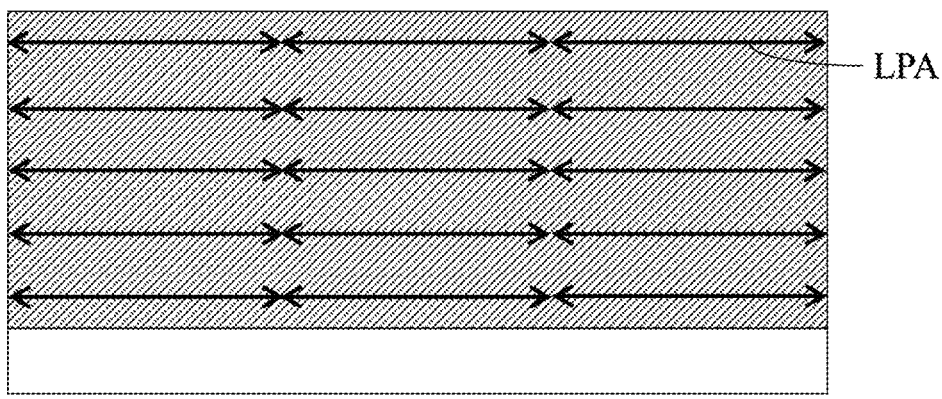
FIGS. 7B and 7C respectively show the projected structured lights with light line patterns in FIG. 7A.
Figure 7C:
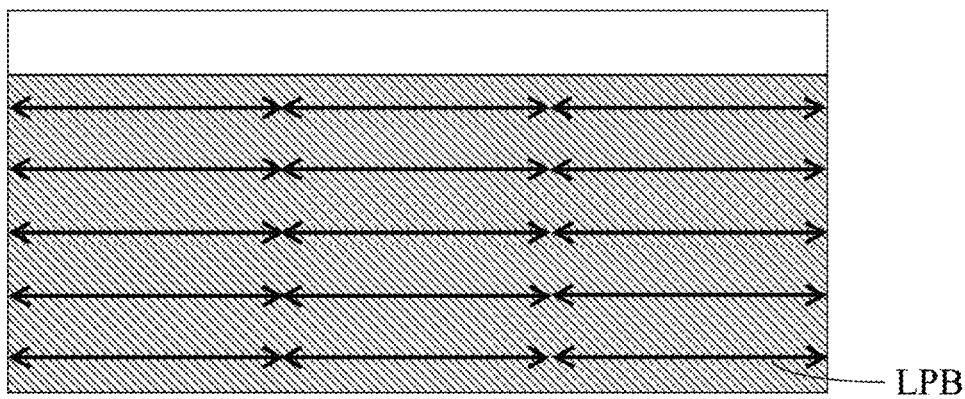

FIG. 7A illustratively shows the projected structured light SLA with light line patterns LPA and the projected structured light SLB with light line patterns LPA by the structured light projector 600 in FIG. 6. As shown in FIG. 7A, in the overlapped area of the structured lights SLA, SLB, the light line patterns LPA are overlapped with the light line patterns LPB, respectively. The overlapped area is also referred to as a high-uniformity projection area in which the light line patterns LPA-LPB are overlapped in a one-to-one manner. Also, FIGS. 7B and 7C respectively show the projected structured lights SLA, SLB with the light line patterns LPA, LPB in FIG. 7A. As shown in FIGS. 7A-7C, the uppermost row of light line patterns LPA are all non-overlapped with any light line pattern LPB, and the lowermost row of light line patterns LPB are all non-overlapped with any light line pattern LPA. In the exemplary example shown in FIGS. 7A-7C, the projected structured lights SLA, SLB are overlapped in a vertical direction. In other embodiments, by suitably adjusting the relative positions of the light sources 610A, 610B, the projected structured lights SLA, SLB may be overlapped in a horizontal direction or in a diagonal direction.

In certain embodiments, the light line patterns of the structured light SLA and the light line patterns of the structured light SLB are all M×N light line patterns. Particularly, in a case in which the structured lights SLA and SLB are overlapped in a vertical direction, in some embodiments, (M−1)×N light line patterns of the structured light SLA and (M−1)×N light line patterns of the structured light SLB are overlapped onto the region of space S, where M and N are integers greater than 1; alternatively, in some other embodiments, (M−i)×N light line patterns of the structured light SLA and (M−i)×N light line patterns of the structured light SLB are overlapped onto the region of space S, where M and N are integers greater than 1, and i is an integer greater than 1 and less than M. In a case in which the structured lights SLA and SLB are overlapped in a horizontal direction, in some embodiments, M×(N−1) light line patterns of the structured light SLA and M×(N−1) light line patterns of the structured light SLB are overlapped onto the region of space S, where M and N are integers greater than 1; alternatively, in some other embodiments, M×(N−j) light line patterns of the structured light SLA and M×(N−j) light line patterns of the structured light SLB are overlapped onto the region of space S, where M and N are integers greater than 1, and j is an integer greater than 1 and less than N.

Figure 8:
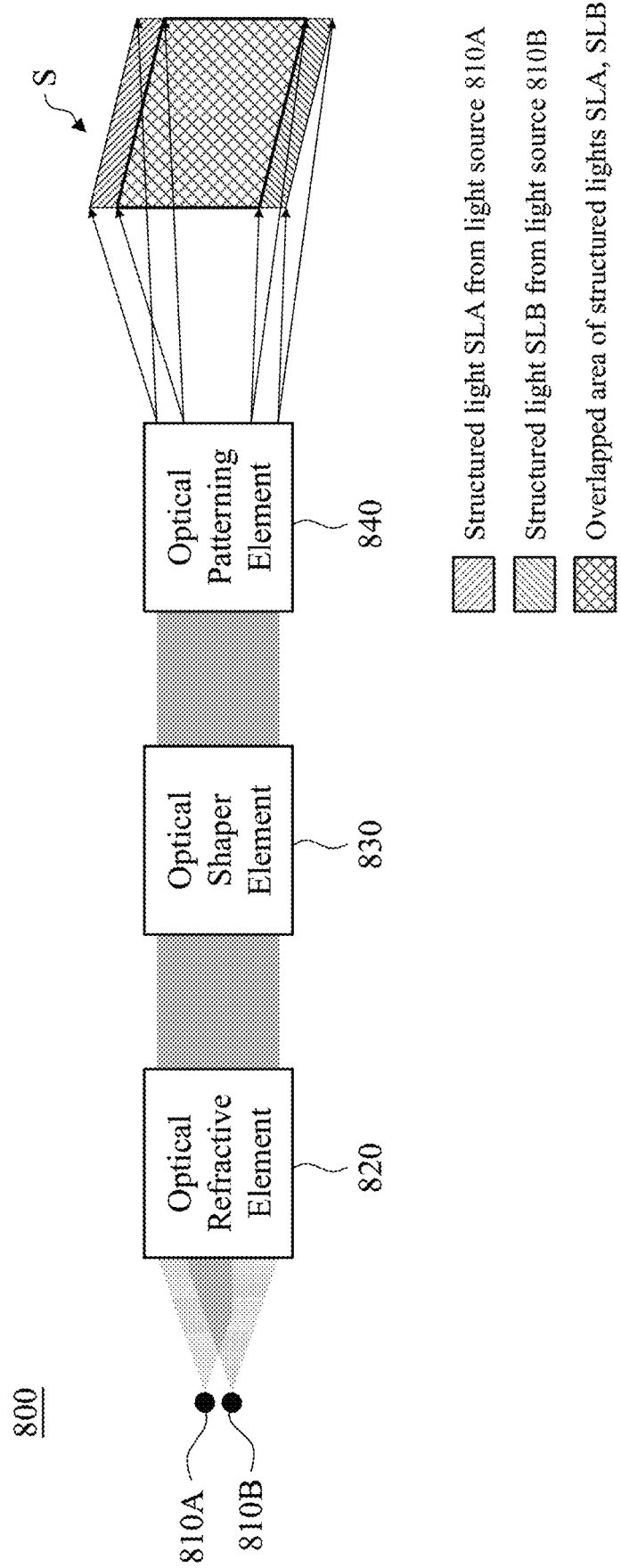
FIG. 8 is a schematic diagram of a structured light projector in accordance with one or more embodiments of the invention.

The illustration of FIGS. 7A-7C with an overlapped area of light line patterns for high-uniformity projection may be achieved by another structured light projector derived from the structured light projector 600 in FIG. 6. FIG. 8 is a schematic diagram of a structured light projector 800 in accordance with one or more embodiments of the invention. As shown in FIG. 8, the structured light projector 800 includes light sources 810A-810B, an optical refractive element 820, an optical shaper element 830 and an optical patterning element 840. Each of the light sources 810A-810B is configured to emit incoherent light, and may be a laser source, such as a VCSEL, a DFB semiconductor laser or another suitable light source. The optical refractive element 820 is arranged over the light sources 810A-810B for refracting the incoherent lights from the light sources 810A-810B towards the optical shaper element 830. The optical refractive element 820 may be, but is not limited to, a collimating lens, a convex lens, a concave lens, a liquid crystal lens or a Fresnel lens. For the incoherent lights respectively emitted by the light sources 810A-810B being the same, the distance between the light source 810A and the optical refractive element 820 may be substantially the same as the distance between the light source 810B and the optical refractive element 820. The optical shaper element 830 is arranged between the optical refractive element 820 and the optical patterning element 840 for shaping the diffractive light lines refracted by the optical refractive element 820 to generate structured lights SLA, SLB each with light dot patterns and project the structured lights SLA, SLB onto a region of space S. The optical shaper element 830 may be a two-dimensional tiling DOE, a microlens array, a Fresnel lens array, an HOE, or another optical element suitable for shaping incoherent light into a structured light with light dot patterns. The optical patterning element 840 is arranged over a light projection side of the optical shaper element 830 for patterning and converting the light dot patterns of the structured lights SLA, SLB into light line patterns. The optical patterning element 840 may be a diffractive line pattern generating element, such as a one-dimensional fan out DOE, or another optical element suitable for generating diffractive light dots in one direction.

Figure 9:
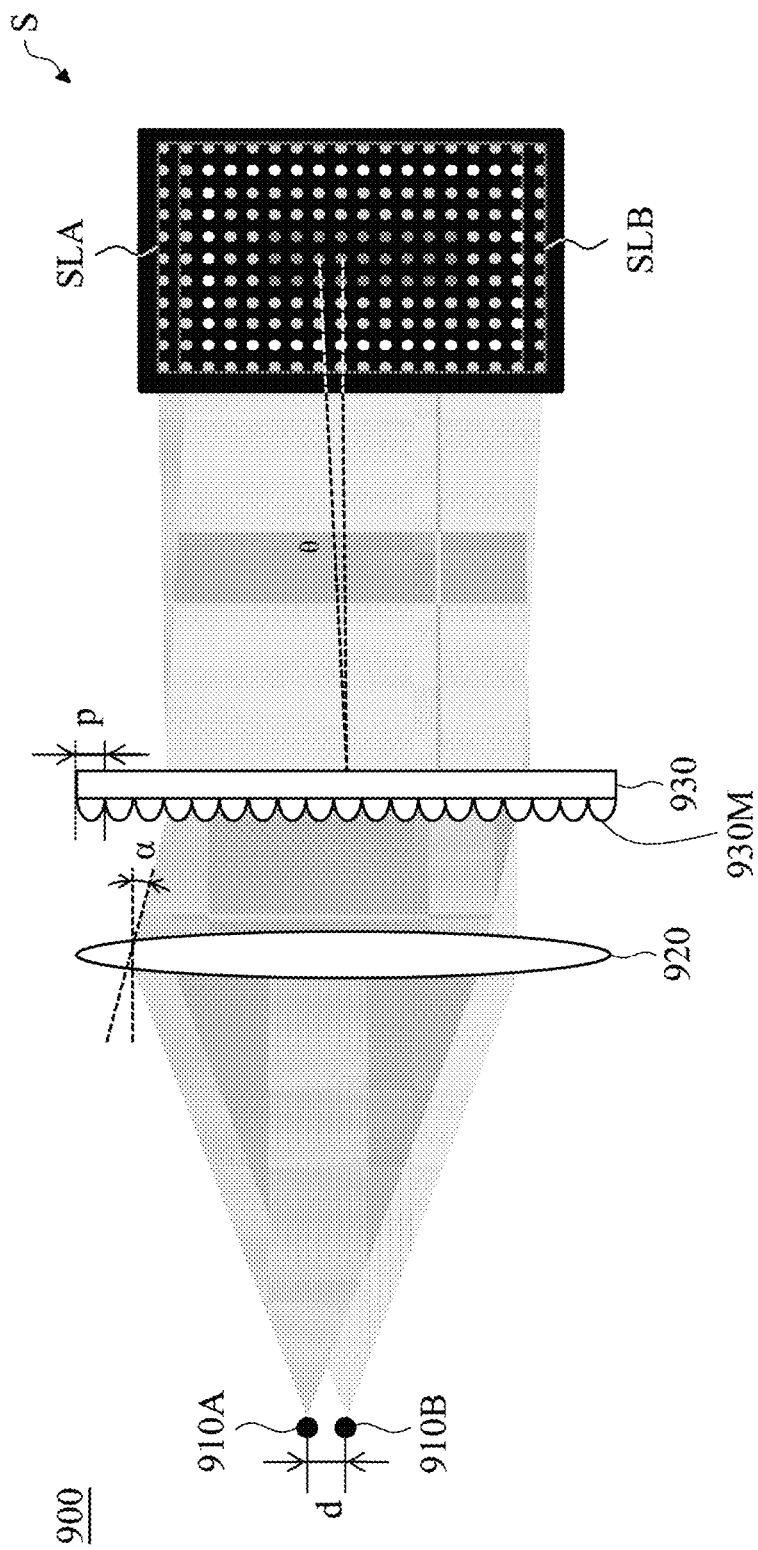
FIG. 9 illustrates an exemplary arrangement of a structured light projector in accordance with one or more embodiments of the invention.

FIG. 9 illustrates an exemplary arrangement of a structured light projector 900 in accordance with one or more embodiments of the invention. As shown in FIG. 9, the structured light projector 900 includes light sources 910A-910B, an optical refractive element 920 and an optical shaper element 930. The light sources 910A-910B, the optical refractive element 920 and the optical shaper element 930 are respectively similar to the light sources 210A-210B, the optical refractive element 220 and the optical shaper element 230 of the structured light projector 200 in FIG. 2. In particular, the optical refractive element 920 is a convex lens, and the optical shaper element 930 is a microlens array which plural microstructures 930M arranged in an array. In FIG. 9, the angle α is $\tan^{-1}(d/f_{\it{eff}})$, where d is the pitch between the light sources 910A-910B, and $f_{\it{eff}}$ is the effective focal length of the optical refractive element 920. The effective focal length $f_{\it{eff}}$ of the optical refractive element 920 is substantially identical to the distance between the light source 910A/910B and the optical refractive element 920. The angle θ between the center of the structured light SLA and the center of the structured light SLB with respect to the center of the optical shaper element 930 is $\sin^{-1}(\lambda/d)$, where λ is the wavelength of the light emitted by the light sources 910A-910B. The light dot patterns of the structured lights SLA, SLB are overlapped if the angle θ is identical to the angle α. The arrangement positions of the light sources 910A-910B may be determined according to the above descriptions. The arrangement positions of the light sources in accordance with various embodiments of the invention may be determined similarly.

Figure 10:
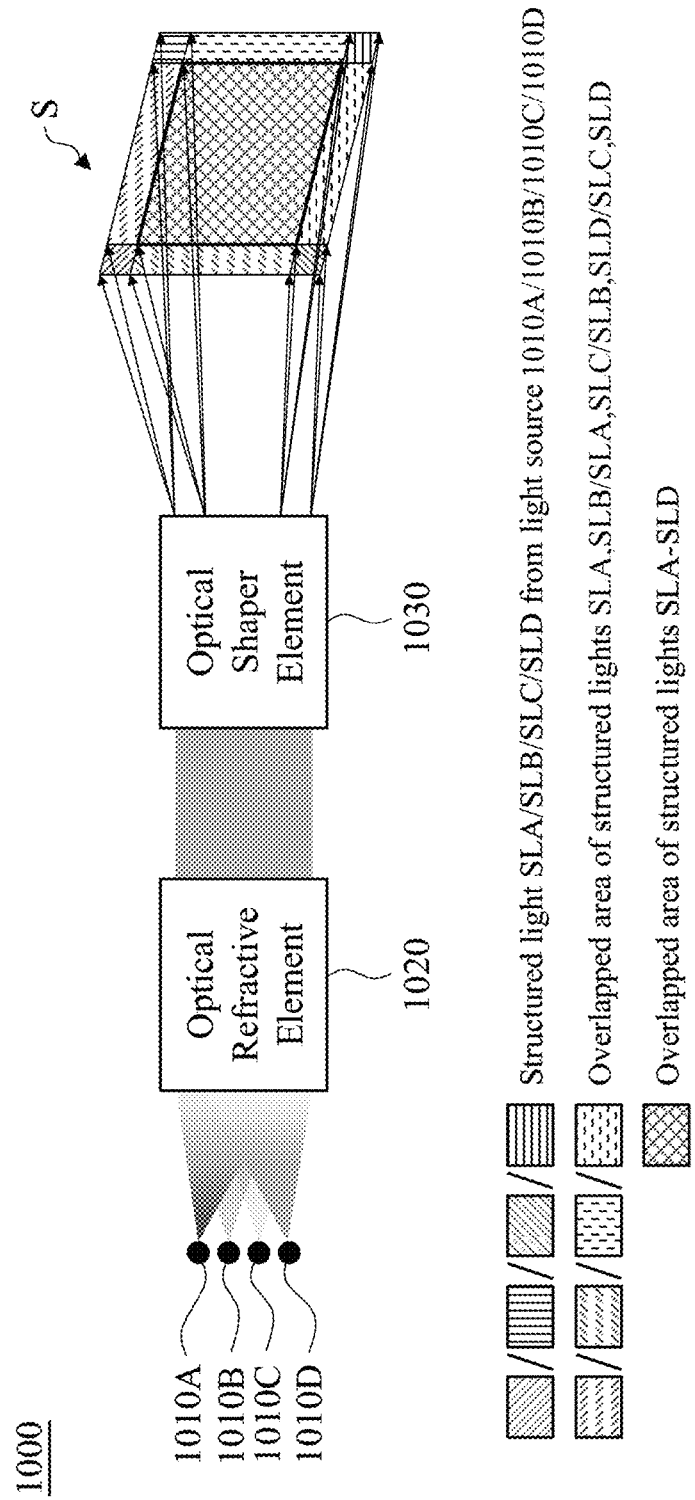
FIG. 10 is a schematic diagram of a structured light projector in accordance with one or more embodiments of the invention.

FIG. 10 is a schematic diagram of a structured light projector 200 in accordance with one or more embodiments of the invention. As shown in FIG. 10, the structured light projector 1000 includes light sources 1010A-1010D, an optical refractive element 1020 and an optical shaper element 1030. The light sources 1010A-1010D may be arranged respectively at four corners of an imaginary square. Each of the light sources 1010A-1010D is configured to emit incoherent light, and may be a laser source, such as a VCSEL, a DFB semiconductor laser or another suitable light source. The optical refractive element 1020 is arranged over the light sources 1010A-1010D for refracting the incoherent lights from the light sources 1010A-1010D towards the optical shaper element 1030. The optical refractive element 1020 may be, but is not limited to, a collimating lens, a convex lens, a concave lens, a liquid crystal lens or a Fresnel lens. For the incoherent lights respectively emitted by the light sources 1010A-1010D being the same, the distance between the light source 1010A and the optical refractive element 1020 may be substantially the same as the distance between the light source 1010B and the optical refractive element 1020, may be substantially the same as the distance between the light source 1010C and the optical refractive element 1020, and may be substantially the same as the distance between the light source 1010D and the optical refractive element 1020. The optical shaper element 1030 is arranged over the optical refractive element 1020 for shaping the incoherent lights refracted by the optical refractive element 1020 to generate structured lights SLA, SLB. For the configuration of the structured light projector 1000, each of the structured lights SLA, SLB may be generated with plural optical patterns, such as light dot patterns or the like. The optical shaper element 1030 may be a two-dimensional fan out DOE, a microlens array, or another optical element suitable for shaping incoherent light into a structured light with optical patterns. The structured lights SLA, SLB are projected and are overlapped onto a region of space S.

Figure 11A:
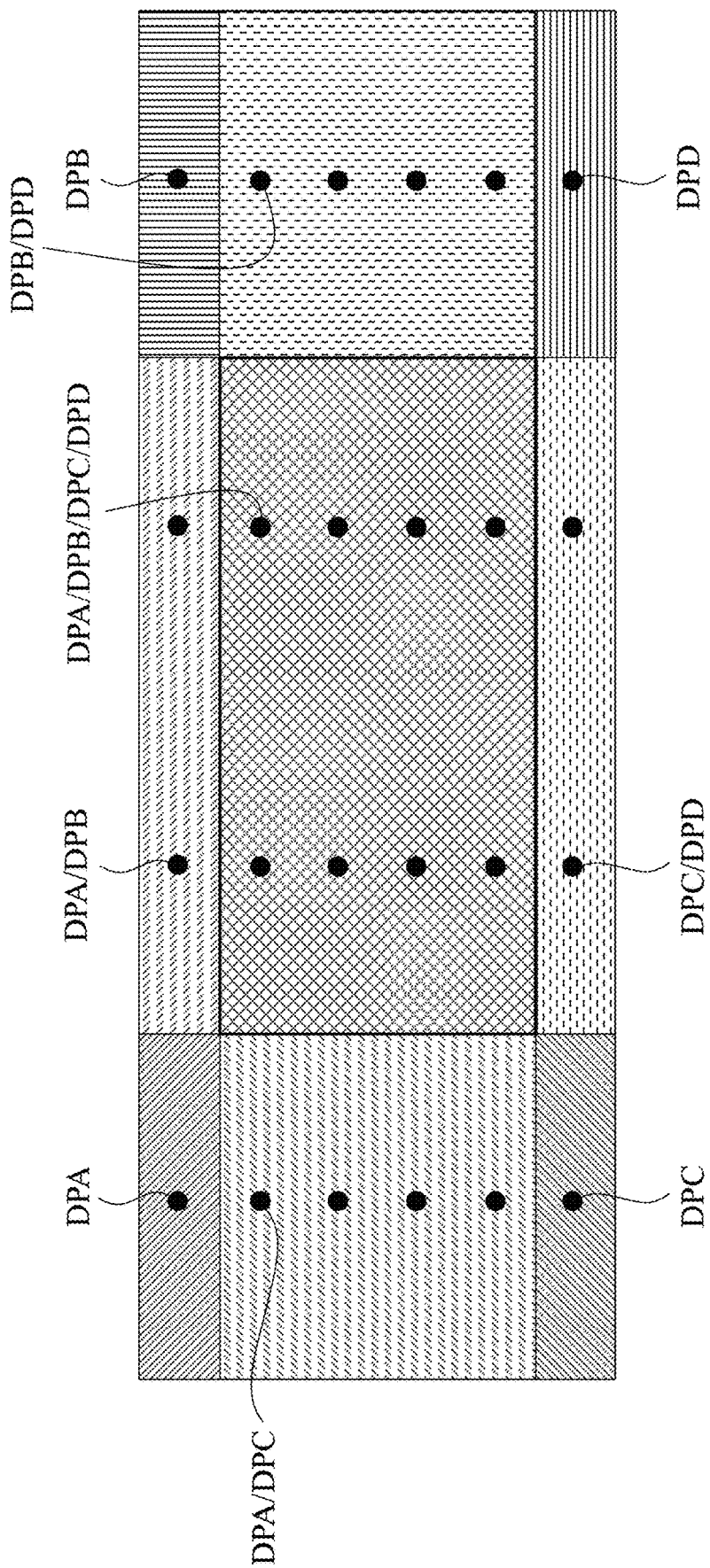
FIG. 11A illustratively shows projected structured lights with light dot patterns by the structured light projector in FIG. 10.
Figure 11B:
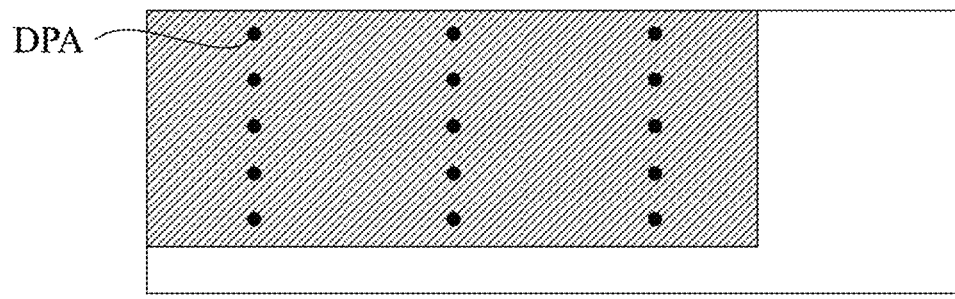
FIGS. 11B-11E respectively show the projected structured lights with light dot patterns in FIG. 11A.
Figure 11C:
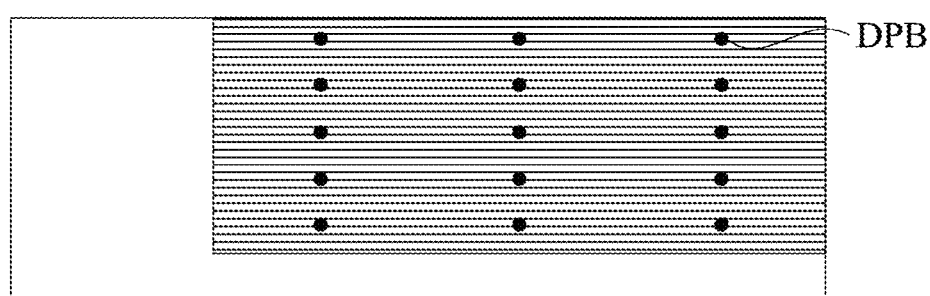
Figure 11D:
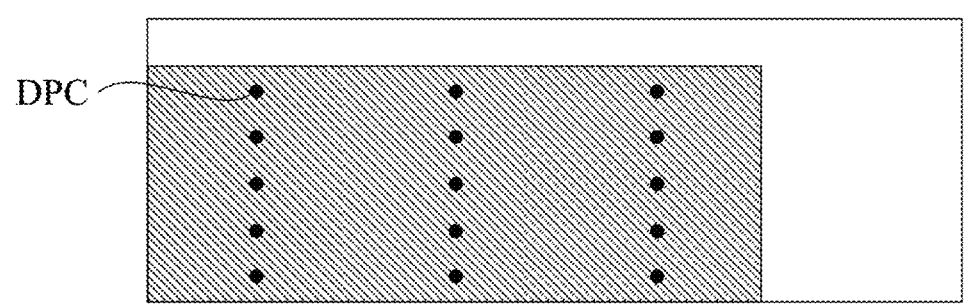
Figure 11E:
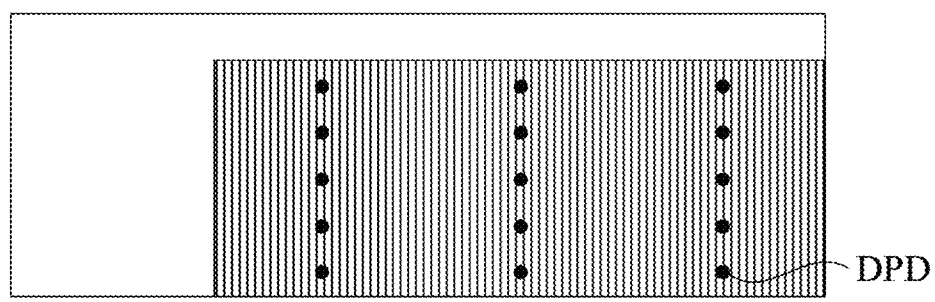

FIG. 11A illustratively shows the projected structured light SLA with light dot patterns DPA, the projected structured light SLB with light dot patterns DPB, the projected structured light SLC with light dot patterns DPC and the projected structured light SLD with light dot patterns DPD by the structured light projector 1000 in FIG. 10. As shown in FIG. 11A, in the overlapped area of the structured lights SLA-SLD, the light dot patterns DPA are respectively overlapped with the light dot patterns DPB, and are respectively overlapped with the light dot patterns DPC, and are respectively overlapped with the light dot patterns DPD; the light dot patterns DPA are respectively overlapped with the light dot patterns DPB in the overlapped area of the structured lights SLA-SLB, the light dot patterns DPA are respectively overlapped with the light dot patterns DPC in the overlapped area of the structured lights SLA, SLC, the light dot patterns DPB are respectively overlapped with the light dot patterns DPD in the overlapped area of the structured lights SLB, SLD, the light dot patterns DPC are respectively overlapped with the light dot patterns DPD in the overlapped area of the structured lights SLC, SLD. The overlapped area of the projected structured lights SLA-SLD is also referred to as a high-uniformity projection area in which the light dot patterns DPA-DPD are overlapped in a one-to-one manner. Also, FIGS. 11B-11E respectively show the projected structured lights SLA-SLD with the light dot patterns DPA-DPD in FIG. 11A. As shown in FIGS. 11A-11E, the top leftmost light dot pattern DPA is non-overlapped with any of light dot patterns DPB-DPD, the top rightmost light dot pattern DPB is non-overlapped with any of light dot patterns DPA, DPC-DPD, the bottom leftmost light dot pattern DPC is non-overlapped with any of light dot patterns DPA-DPB, DPD, and the bottom rightmost light dot pattern DPD is non-overlapped with any of light dot patterns DPA-DPC. In the exemplary example shown in FIGS. 11A-11E, the projected structured lights SLA-SLD are overlapped in two perpendicular directions, e.g. in both vertical and horizontal directions. In other embodiments, by suitably adjusting the relative positions of the light sources 1010A-1010D, the projected structured lights SLA-SLD may be overlapped in two perpendicular diagonal directions.

In certain embodiments, the light dot patterns of the structured light SLA, the light dot patterns of the structured light SLB, the light dot patterns of the structured light SLC and the light dot patterns of the structured light SLD are all M×N light dot patterns. Particularly, in a case in which the structured lights SLA-SLD are overlapped in both vertical and horizontal directions, in some embodiments, (M−1)× (N−1) light dot patterns of the structured light SLA, (M−1)× (N−1) light dot patterns of the structured light SLB, (M−1)× (N−1) light dot patterns of the structured light SLC and (M−1)×(N−1) light dot patterns of the structured light SLD are overlapped onto the region of space S, where M and N are integers greater than 1; alternatively, in some other embodiments, (M−i)×(N−j) light dot patterns of the structured light SLA, (M−i)×(N−j) light dot patterns of the structured light SLB, (M−i)×(N−j) light dot patterns of the structured light SLC and (M−i)×(N−j) light dot patterns of the structured light SLD are overlapped onto the region of space S, where M and N are integers greater than 1, i is an integer greater than 1 and less than M, and j is an integer greater than 1 and less than N.

Figure 12:
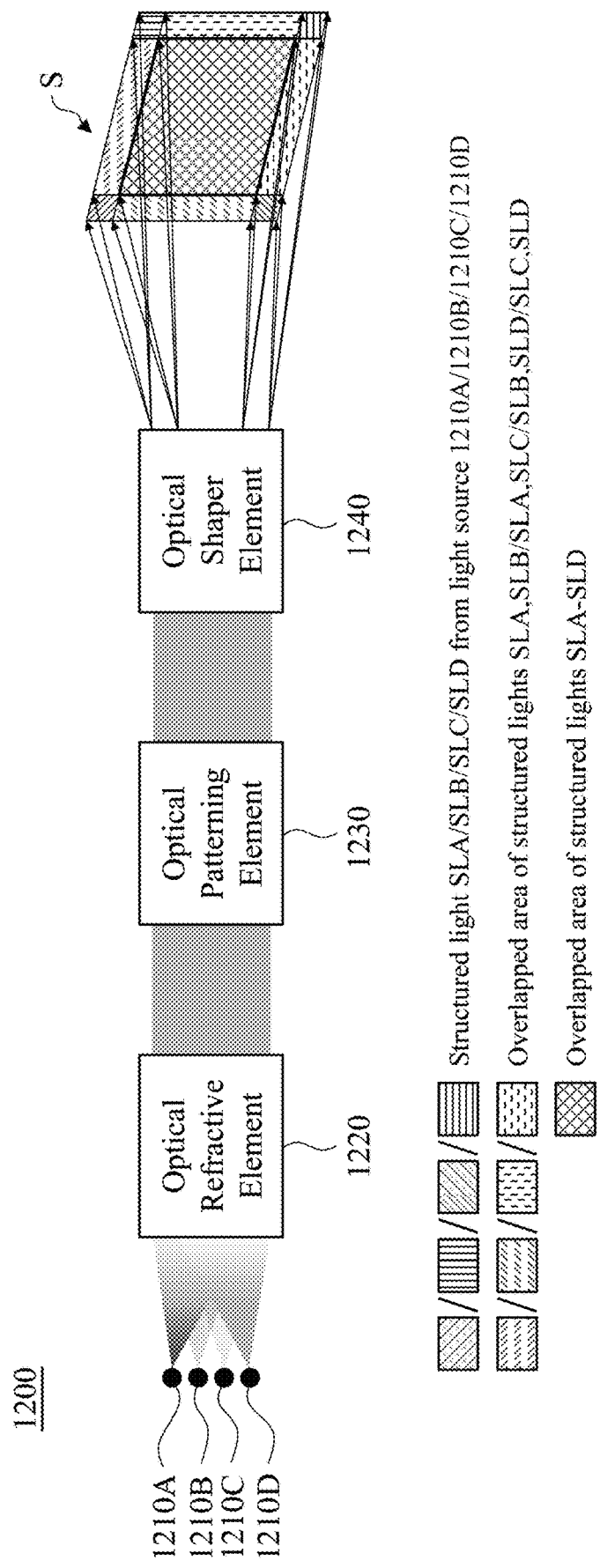
FIG. 12 is a schematic diagram of a structured light projector in accordance with one or more embodiments of the invention.

FIG. 12 is a schematic diagram of a structured light projector 1200 in accordance with one or more embodiments of the invention. As shown in FIG. 12, the structured light projector 1200 includes light sources 1210A-1210D, an optical refractive element 1220, an optical patterning element 1230 and an optical shaper element 1240. The light sources 1210A-1210D may be arranged respectively at four corners of an imaginary square. Each of the light sources 1210A-1210D is configured to emit incoherent light, and may be a laser source, such as a VCSEL, a DFB semiconductor laser or another suitable light source. The optical refractive element 1220 is arranged over the light sources 1210A-1210D for refracting the incoherent lights from the light sources 1210A-1210D towards the optical patterning element 1230. The optical refractive element 1220 may be, but is not limited to, a collimating lens, a convex lens, a concave lens, a liquid crystal lens or a Fresnel lens. For the incoherent lights respectively emitted by the light sources 1210A-1210D being the same, the distance between the light source 1210A and the optical refractive element 1220 may be substantially the same as the distance between the light source 1210B and the optical refractive element 1220, may be substantially the same as the distance between the light source 1210C and the optical refractive element 1220, and may be substantially the same as the distance between the light source 1210D and the optical refractive element 1220. The optical patterning element 1230 is arranged between the optical refractive element 1220 and the optical shaper element 1240 for patterning the incoherent lights refracted by the optical refractive element 1220 into diffractive light lines. The optical patterning element 1230 may be a diffractive line pattern generating element, such as a line generator DOE, or another optical element suitable for generating diffractive light lines. The optical shaper element 1240 is arranged over the optical patterning element 1230 for shaping the diffractive light lines to generate structured lights SLA-SLD. For the configuration of the structured light projector 1200, each of the structured lights SLA-SLD may be generated with plural optical patterns, such as light line patterns or the like. The optical shaper element 1240 may be a two-dimensional fan out DOE or another optical element suitable for shaping incoherent light into a structured light with optical patterns. The structured lights SLA-SLD are projected and are overlapped onto a region of space S.

Figure 13A:
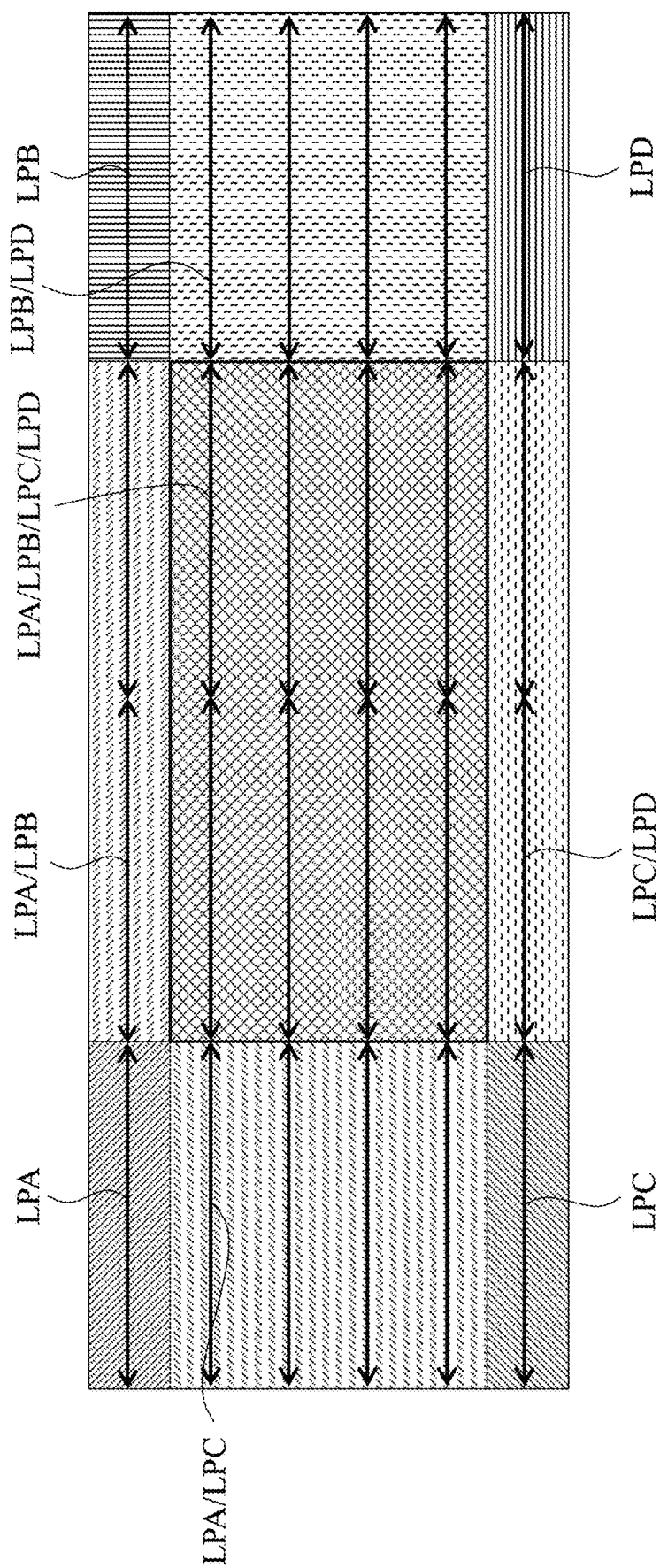
FIG. 13A illustratively shows projected structured lights with light line patterns by the structured light projector in FIG. 12.
Figure 13B:
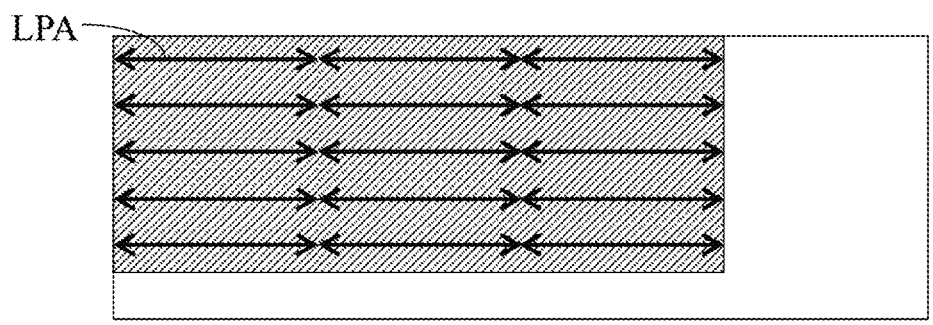
FIGS. 13B-13E respectively show the projected structured lights with light line patterns in FIG. 13A.
Figure 13C:
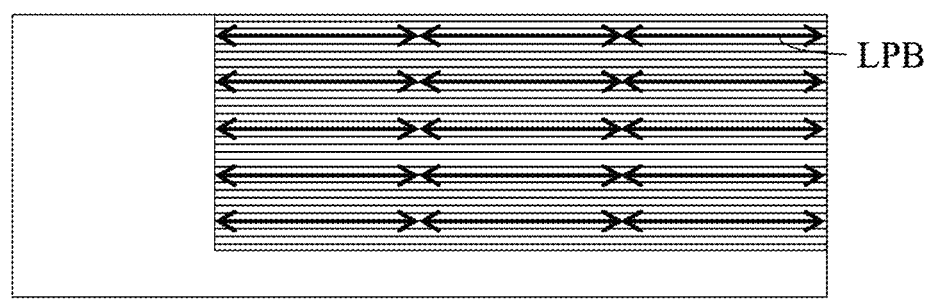
Figure 13D:
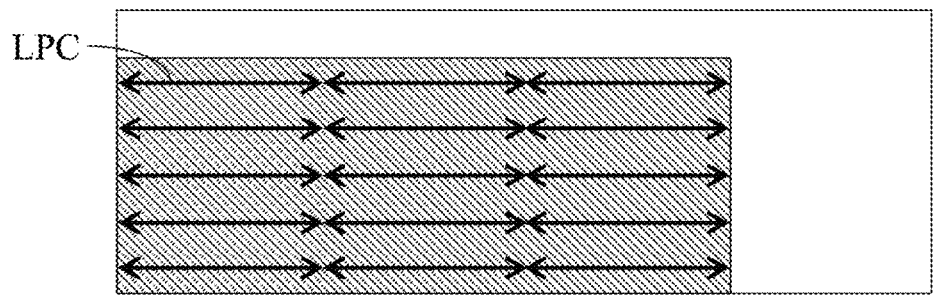
Figure 13E:
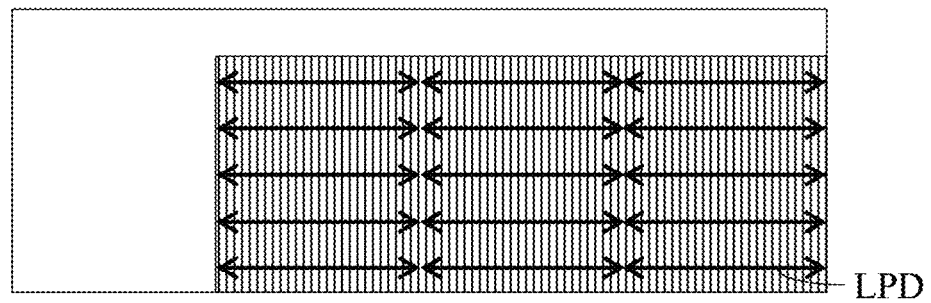

FIG. 13A illustratively shows the projected structured light SLA with light line patterns LPA, the projected structured light SLB with light line patterns LPB, the projected structured light SLC with light line patterns LPC and the projected structured light SLD with light line patterns LPD by the structured light projector 1200 in FIG. 12. As shown in FIG. 13A, in the overlapped area of the structured lights SLA-SLD, the light line patterns LPA are respectively overlapped with the light line patterns LPB, and are respectively overlapped with the light line patterns LPC, and are respectively overlapped with the light line patterns LPD; the light line patterns LPA are respectively overlapped with the light line patterns LPB in the overlapped area of the structured lights SLA-SLB, the light line patterns LPA are respectively overlapped with the light line patterns LPC in the overlapped area of the structured lights SLA, SLC, the light line patterns LPB are respectively overlapped with the light line patterns LPC in the overlapped area of the structured lights SLB-SLC, the light line patterns LPB are respectively overlapped with the light line patterns LPD in the overlapped area of the structured lights SLB, SLD. The overlapped area of the projected structured lights SLA-SLD is also referred to as a high-uniformity projection area in which the light line patterns LPA-LPD are overlapped in a one-to-one manner. Also, FIGS. 13B-13E respectively show the projected structured lights SLA-SLD with the light line patterns LPA-LPD in FIG. 13A. As shown in FIGS. 13A-13E, the top leftmost light line pattern LPA is non-overlapped with any of light line patterns LPB-LPD, the top rightmost light line pattern LPB is non-overlapped with any of light line patterns LPA, LPC-LPD, the bottom leftmost light line pattern LPC is non-overlapped with any of light line patterns LPA-LPB, LPD, and the bottom rightmost light line pattern LPD is non-overlapped with any of light line patterns LPA-LPC. In the exemplary example shown in FIGS. 13A-13E, the projected structured lights SLA-SLD are overlapped in two perpendicular directions, e.g. in both vertical and horizontal directions. In other embodiments, by suitably adjusting the relative positions of the light sources 1210A-1210D, the projected structured lights SLA-SLD may be overlapped in two perpendicular diagonal directions.

In certain embodiments, the light line patterns of the structured light SLA, the light line patterns of the structured light SLB, the light line patterns of the structured light SLC and the light line patterns of the structured light SLD are all M×N light line patterns. Particularly, in a case in which the structured lights SLA-SLD are overlapped in both vertical and horizontal directions, in some embodiments, (M−1)×(N−1) light line patterns of the structured light SLA, (M−1)×(N−1) light line patterns of the structured light SLB, (M−1)×(N−1) light line patterns of the structured light SLC and (M−1)×(N−1) light line patterns of the structured light SLD are overlapped onto the region of space S, where M and N are integers greater than 1; alternatively, in some other embodiments, (M−i)×(N−j) light line patterns of the structured light SLA, (M−i)×(N−j) light line patterns of the structured light SLB, (M−i)×(N−j) light line patterns of the structured light SLC and (M−i)×(N−j) light line patterns of the structured light SLD are overlapped onto the region of space S, where M and N are integers greater than 1, i is an integer greater than 1 and less than M, and j is an integer greater than 1 and less than N.

Figure 14A:
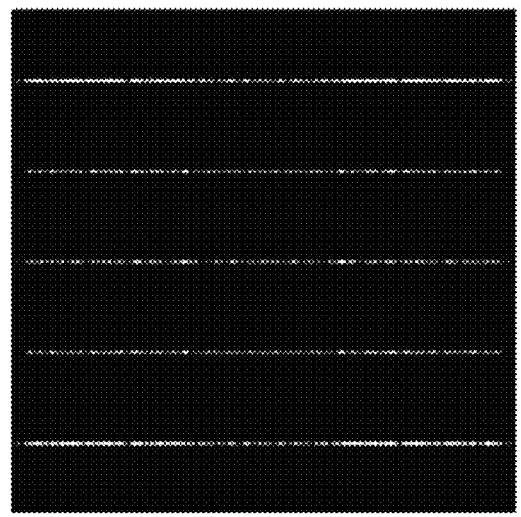
FIGS. 14A and 14B illustratively show the projected structured lights with light line patterns by a comparative example and the structured light projector in FIG. 12, respectively.
Figure 14B:
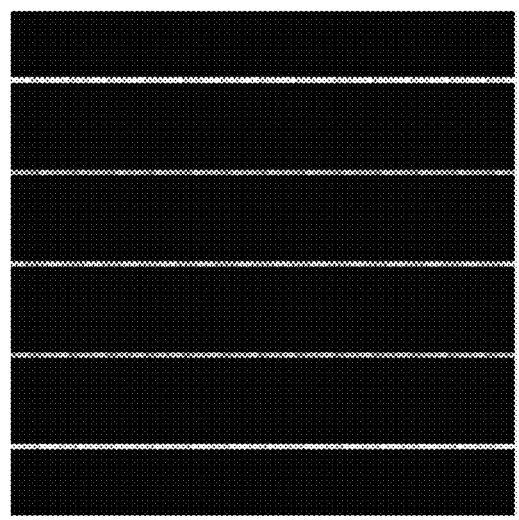
Figure 15A:
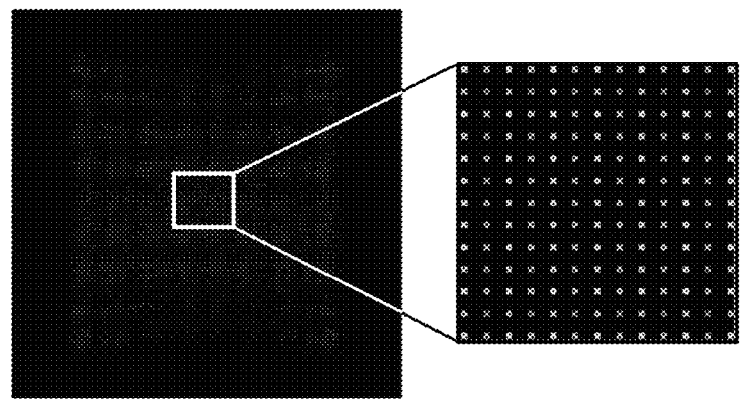
FIGS. 15A and 15B illustratively show the projected structured lights with light dot patterns by a comparative example and the structured light projector in FIG. 10, respectively.
Figure 15B:
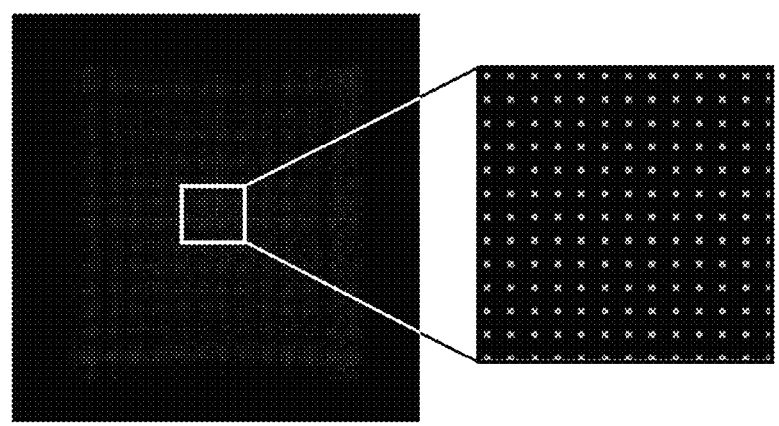

FIGS. 14A and 14B illustratively show the projected structured lights with light line patterns by a comparative example and the structured light projector 1200 in FIG. 12, respectively. The comparative example is similar to the structured light projector 100 in FIG. 1 and its projected light line patterns are all non-overlapped. As can be seen from FIGS. 14A and 14B, the uniformity of the light line patterns projected by the structured light projector 1200 is significantly higher than that of the light line patterns projected by the comparative example. Moreover, FIGS. 15A and 15B illustratively show the projected structured lights with light dot patterns by a comparative example and the structured light projector 1000 in FIG. 10, respectively. The comparative example is similar to the structured light projector 100 in FIG. 1 and its projected light dot patterns are all non-overlapped. As can be seen from FIGS. 15A and 15B, the uniformity of the light dot patterns projected by the structured light projector 1000 is significantly higher than that of the light dot patterns projected by the comparative example.

Figure 16:
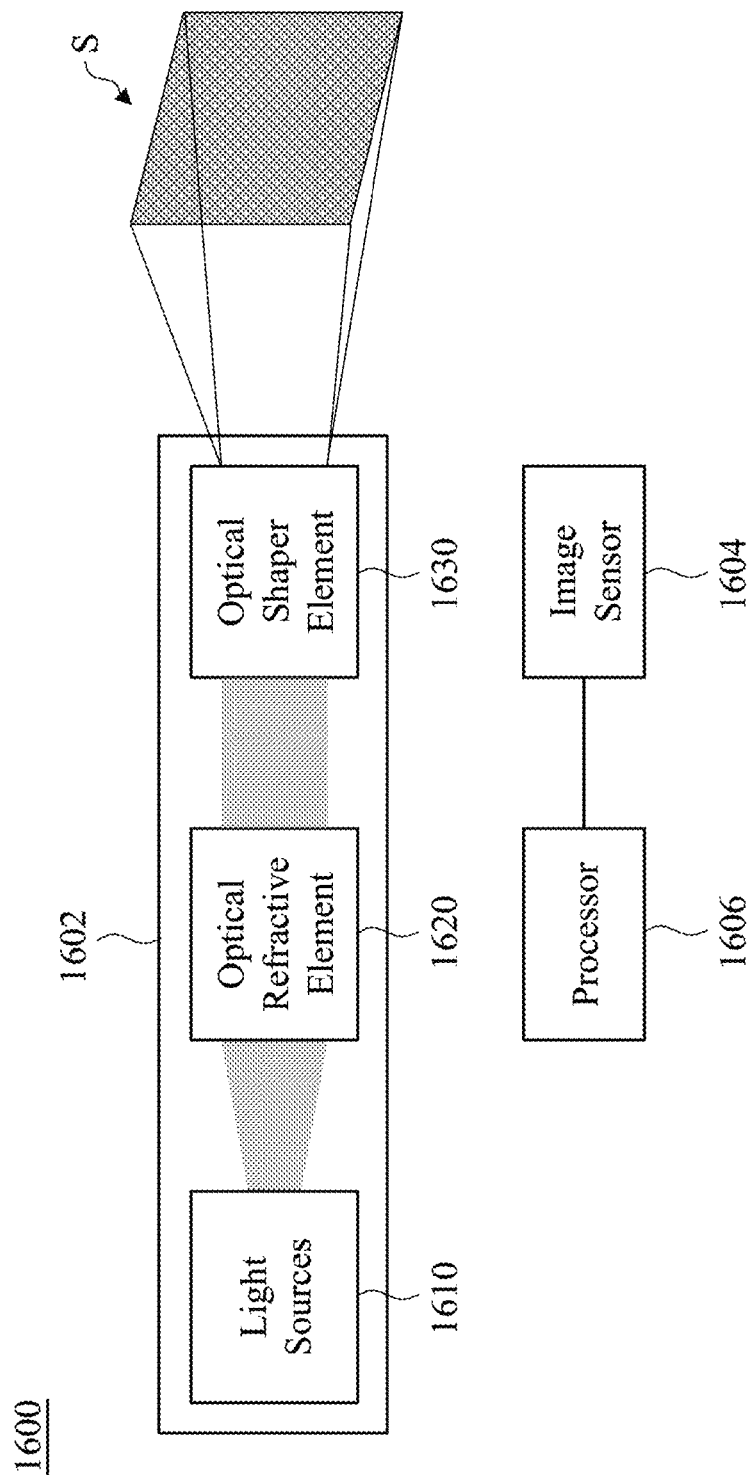
FIG. 16 is a schematic diagram of a three-dimensional image sensing apparatus in accordance with one or more embodiments of the invention.

FIG. 16 is a schematic diagram of a three-dimensional image sensing apparatus 1600 in accordance with one or more embodiments of the invention. As shown in FIG. 16, the three-dimensional image sensing apparatus 1600 includes light sources 1610, an optical refractive element 1620 and an optical shaper element 1630 as well as an image sensor 1604 and a processor 1606. The light sources 1610, the optical refractive element 1620 and the optical shaper element 1630 may be respectively similar to the light sources 210A-210B, the optical refractive element 220 and the optical shaper element 230 of the structured light projector 200 in FIG. 2, and may be included in a structured light projector 1602. In other words, the structured light projector 1602 may be similar to the structured light projector 200 the in FIG. 2. The structured light projector 1602 may be implemented as the structured light projector 400, 500, 600, 800, 1000, 1200 or another similar structured light projector for various embodiments. The structured light projector 1602 is configured to project overlapped structured lights onto a region of space S. The image sensor 1604 is configured to capture an image corresponding to the optical pattern from the region of space. The image sensor 1604 may be a structured light sensor, a time of flight (ToF) sensor, or a combination thereof, and may include a charge-coupled device (CCD) sensor, a complementary metal-oxide semiconductor (CMOS) sensor, etc. The processor 1606 is configured to perform computing on the image captured by the image sensor 1605 to obtain three-dimensional data associated with the region of space S.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:

1. A structured light projector, comprising:
   a first light source and a second light source configured to respectively emit first incoherent light and second incoherent light;
   an optical refractive element arranged over the first and second light sources for refracting the first incoherent light and the second incoherent light;
   an optical shaper element arranged over the optical refractive element for shaping the first incoherent light to generate and project first structured light with M×N first light line patterns and shaping the second incoherent light to generate and project second structured light with M×N second light line patterns, wherein (M−1)×N of the M×N first light line patterns projected onto a region of space are respectively overlapped with (M−1)×N of the M×N second light line patterns projected onto the region of space, where M and N are integers greater than 1; and
   a diffractive line pattern generating element arranged between the optical refractive element and the optical shaper element or arranged over a light projection side of the optical shaper element.

2. The structured light projector of claim 1, further comprising:
   a third light source configured to emit third incoherent light; and
   a fourth light source configured to emit fourth incoherent light;
   wherein the optical refractive element is also arranged over the third and fourth light sources for refracting the third incoherent light and the fourth incoherent light, wherein the optical shaper element is arranged for also shaping the third incoherent light to generate third structured light with M×N third light line patterns and shaping the fourth incoherent light to generate fourth structured light with M×N fourth light line patterns, and wherein the first structured light, the second structured light, the third structured light and the fourth structured light are overlapped onto the region of space.

3. The structured light projector of claim 2, wherein the first to fourth light sources are arranged respectively at four corners of an imaginary square.

4. The structured light projector of claim 2, wherein the M×N first light line patterns, the M×N second light line patterns, the M×N third light line patterns and the M×N fourth light line patterns are overlapped in two perpendicular dimensions.

5. The structured light projector of claim 2,
   wherein (M−1)×(N−1) of the M×N first light line patterns, (M−1)×(N−1) of the M×N second light line patterns, (M−1)×(N−1) of the M×N third light line patterns, and (M−1)×(N−1) of the M×N fourth light line patterns are overlapped onto the region of space.

6. The structured light projector of claim 1, wherein the optical shaper element and the diffractive line pattern generating element are one-dimensional fan out DOEs.

7. The structured light projector of claim 6, wherein the optical refractive element and the diffractive line pattern generating element are an integrated one-dimensional fan out DOE.

8. The structured light projector of claim 1, wherein a distance between the first light source and the optical refractive element is substantially the same as a distance between the second light source and the optical refractive element.

9. The structured light projector of claim 1, wherein the first and second light sources are vertical cavity surface emitting lasers (VCSELs).

10. The structured light projector of claim 1, wherein the optical shaper element is a two-dimensional fan out diffractive optical element (DOE).

11. The structured light projector of claim 1, wherein the optical shaper element is a microlens array.

12. The structured light projector of claim 1, wherein the optical refractive element is a collimating lens.

13. A structured light projector, comprising:
   a first light source and a second light source configured to respectively emit first incoherent light and second incoherent light;
   an optical refractive element arranged over the first and second light sources for refracting the first incoherent light and the second incoherent light;
   an optical shaper element arranged over the optical refractive element for shaping the first incoherent light to generate and project first structured light with M×N first light dot patterns and shaping the second incoherent light to generate and project second structured light with M×N second light dot patterns, wherein (M−1)×N of the M×N first light dot patterns projected onto a region of space are respectively overlapped with (M−1)×N of the M×N second light dot patterns projected onto the region of space, where M and N are integers greater than 1.

14. The structured light projector of claim 13, further comprising:

an optical patterning element arranged between the optical refractive element and the optical shaper element or arranged over a light projection side of the optical shaper element.

15. The structured light projector of claim 14, wherein the optical shaper element and the optical patterning element are one-dimensional fan out DOEs.

16. The structured light projector of claim 14, wherein the optical refractive element and the optical patterning element are an integrated one-dimensional fan out DOE.

17. The structured light projector of claim 13, wherein the optical shaper element is a two-dimensional fan out DOE or a microlens array.

18. The structured light projector of claim 13, further comprising:
   a third light source configured to emit third incoherent light; and
   a fourth light source configured to emit fourth incoherent light;
   wherein the optical refractive element is also arranged over the third and fourth light sources for refracting the third incoherent light and the fourth incoherent light, wherein the optical shaper element is arranged for also shaping the third incoherent light to generate third structured light with M×N third light dot patterns and shaping the fourth incoherent light to generate fourth structured light with M×N fourth light dot patterns, and wherein (M−1)×(N−1) of the M×N first light dot patterns, (M−1)×(N−1) of the M×N second light dot patterns, (M−1)×(N−1) of the M×N third light dot patterns, and (M−1)×(N−1) of the M×N fourth light dot patterns are overlapped onto the region of space.

19. A three-dimensional image sensing apparatus comprising:
   a plurality of light sources configured to respectively emit a plurality of incoherent lights;
   an optical refractive element arranged over the light sources for refracting the incoherent lights;
   an optical shaper element arranged over the optical refractive element for shaping the incoherent lights to generate and project a plurality of structured lights each with M×N light line patterns, wherein (M−1)×N of the M×N light line patterns of one of the structured lights projected onto a region of space are respectively overlapped with (M−1)×N of the M×N light line patterns of one another of the structured lights projected onto the region of space, where M and N are integers greater than 1;
   a diffractive line pattern generating element arranged between the optical refractive element and the optical shaper element or arranged over a light projection side of the optical shaper element;
   an image sensor configured to capture an image from the region of space; and
   a processor configured to perform computing on the image to obtain three-dimensional data associated with the region of space.

20. A three-dimensional image sensing apparatus comprising:
   a plurality of light sources configured to respectively emit a plurality of incoherent lights;
   an optical refractive element arranged over the light sources for refracting the incoherent lights;
   an optical shaper element arranged over the optical refractive element for shaping the incoherent lights to generate and project a plurality of structured lights each with M×N light dot patterns, wherein (M−1)×N of the M×N light dot patterns of one of the structured lights projected onto a region of space are respectively overlapped with (M−1)×N of the M×N light dot patterns of one another of the structured lights projected onto the region of space, where M and N are integers greater than 1;
   an image sensor configured to capture an image from the region of space; and
   a processor configured to perform computing on the image to obtain three-dimensional data associated with the region of space.

* * * * *